United States Patent [19]
Hioki et al.

[11] Patent Number: 6,088,073
[45] Date of Patent: Jul. 11, 2000

[54] DISPLAY DEVICE WITH DESTATICIZING ELEMENTS AND AN ELECTROSTATIC PULSE DELAYING ELEMENT CONNECTED TO EACH OF THE DESTATICIZING ELEMENTS

[75] Inventors: Toshifumi Hioki, Hino; Keitaro Miyata, Fussa, both of Japan

[73] Assignee: Casio Computer Co., Ltd., Tokyo, Japan

[21] Appl. No.: 09/046,959

[22] Filed: Mar. 24, 1998

[30] Foreign Application Priority Data

Apr. 14, 1997 [JP] Japan ..................................... 9-110049

[51] Int. Cl.$^7$ ......................... G02F 1/1333; G02F 1/135; G02F 1/13
[52] U.S. Cl. ................... 349/40; 349/49; 349/54; 349/192
[58] Field of Search ................. 349/40, 49, 50, 349/54, 192

[56] References Cited

U.S. PATENT DOCUMENTS

| | | | |
|---|---|---|---|
| 4,835,653 | 5/1989 | Zhang et al. ............................... | 361/90 |
| 5,068,748 | 11/1991 | Ukai et al. ................................. | 359/59 |
| 5,373,377 | 12/1994 | Ogawa et al. ............................. | 359/59 |
| 5,504,348 | 4/1996 | Yoshida et al. ........................... | 257/59 |
| 5,652,632 | 7/1997 | Shimizu .................................... | 349/40 |
| 5,668,032 | 9/1997 | Holmberg et al. ....................... | 438/144 |
| 5,671,026 | 9/1997 | Shiraki et al. ............................. | 349/40 |
| 5,691,787 | 11/1997 | Shimada et al. .......................... | 349/40 |
| 5,714,770 | 2/1998 | Kim ........................................... | 257/59 |
| 5,767,929 | 6/1998 | Yaichi et al. .............................. | 349/40 |
| 5,818,285 | 10/1998 | Lee et al. .................................. | 327/525 |
| 5,828,428 | 10/1998 | Kim et al. ................................. | 349/40 |
| 5,838,033 | 11/1998 | Smooha .................................... | 257/213 |
| 5,852,480 | 12/1998 | Yajima et al. ............................. | 349/40 |
| 5,949,502 | 9/1999 | Matsunaga et al. ...................... | 349/40 |

FOREIGN PATENT DOCUMENTS

| | | |
|---|---|---|
| 357201071A | 12/1982 | Japan . |
| 61-79259 | 4/1986 | Japan . |
| 403002838A | 1/1991 | Japan . |
| 403049524A | 3/1991 | Japan . |
| 403102912A | 4/1991 | Japan . |
| 408008487A | 1/1996 | Japan . |
| 408222643A | 8/1996 | Japan . |
| 409022948A | 1/1997 | Japan . |

*Primary Examiner*—William L. Sikes
*Assistant Examiner*—Tarifur R. Chowdhury
*Attorney, Agent, or Firm*—Frishauf, Holtz, Goodman, Langer & Chick, P.C.

[57] ABSTRACT

A pair of destaticizing elements and a resistive element for delaying an electrostatic pulse are provided between a short-circuiting line short-circuiting a plurality of data lines and an upper end portion of each of the data lines. When a short electrostatic pulse is applied to an upper end portion of one data line from the outside, the leading edge of the pulse is made gentle by the resistive element. As a result, the destaticizing element can work well in response to even the short electrostatic pulse.

17 Claims, 10 Drawing Sheets

DISPLAY DEVICE WITH DESTATICIZING ELEMENTS AND AN ELECTROSTATIC PULSE DELAYING ELEMENT CONNECTED TO EACH OF THE DESTATICIZING ELEMENTS

BACKGROUND OF THE INVENTION

This invention relates to a display device, and more particularly to an active matrix type liquid crystal display device with semiconductor elements, which includes destaticizing elements for protecting the semiconductor elements and insulating films from breakage through static electricity.

Figure 10:
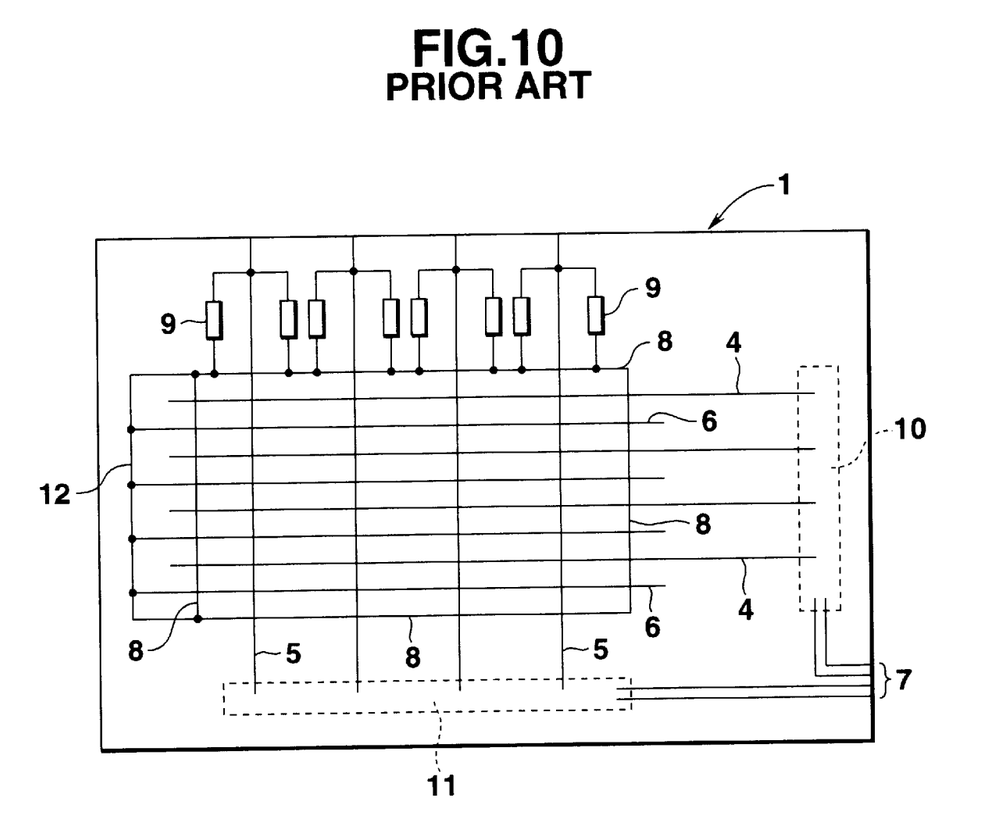
FIG. 10 is a conceptual plan view, showing a circuit formed on an active element substrate which is incorporated in the conventional liquid crystal display device.

FIG. 10 is a schematic plan view, showing a circuit provided on an active element substrate incorporated in the conventional liquid crystal display device. A plurality of pixel electrodes (not shown) which constitute a display area, and thin film transistors (not shown) each connected to a corresponding one of the pixel electrodes are respectively arranged in a matrix on the active element substrate 1. On the active element substrate 1, there are also provided a plurality of scanning lines 4 each for supplying scanning signals to the corresponding thin film transistors, a plurality of data lines 5 each for supplying data signals to the corresponding thin film transistors, a plurality of auxiliary capacitance lines 6 extending parallel to the scanning lines 4 and forming auxiliary capacitance portions between themselves and the pixel electrodes, a plurality of input lines 7 arranged in a lower right portion (in FIG. 10) of the substrate, an annular short-circuiting line 8 located around the pixel electrodes which form the display area, and a plurality of destaticizing elements 9, each adjacent pair of which are arranged parallel to each other between the short-circuiting line 8 and a corresponding one of the data lines 5.

The right ends of the scanning lines 4 extend to a semiconductor chip mounting area 10 located at a right portion of the substrate 1 and indicated by the broken line. The lower ends of the data lines 5 extend to a semiconductor chip mounting area 11 located at a lower portion of the substrate 1 and indicated by the broken line. The upper ends of the data lines 5 extend to the upper end of the substrate 1. The left ends of the auxiliary capacitance lines 6 are connected to a common line 12. The extended ends of some input lines 7 extend to the semiconductor chip mounting area 10, while the extended ends of the other input lines 7 extend to the semiconductor chip mounting area 11. The upper and lower ends of the left side of the short-circuiting line 8 are connected to the common line 12.

Suppose, for example, that in the liquid crystal display device constructed as above, static electricity of high potential is applied from the outside to an upper end portion of the leftmost data line 5 located an upper end surface of the active element substrate 1. Then, the two destaticizing elements 9 connected to the leftmost data line 5 become conductive, whereby the short-circuiting line 8, the common line 12 and the auxiliary capacitance lines 6 come to have the same potential as the leftmost data line 5. At this time, the other destaticizing elements 9 connected to the other data lines 5 also become conductive and come to have the same potential as the short-circuiting line 8, the common line 12 and the auxiliary capacitance lines 6. Thus, the short-circuiting line 8, the common line 12, the auxiliary capacitance lines 6 and all data lines 5 come to have the same potential. This operation is performed when any one of the data lines 5 is charged with static electricity. Accordingly, the potential of the static electricity applied to the data line is lowered since it is guided to the short-circuiting line 8, the common line 12, the auxiliary capacitance lines 6 and the other data lines 5. Thus, the thin film transistor and the insulating film connected to the charged data lines 5 can be protected from breakage due to the static electricity.

The destaticizing element 9 is usually provided in the form of a diode which has an anode electrode connected to the short-circuiting line side, and a cathode electrode connected to the data line 5 side. This kind of destaticizing element 9, however, cannot work well in response to an electrostatic pulse which extremely and abruptly rises to a high potential. Therefore, when such a high-potential electrostatic pulse is applied, it flows through the data lines 5 only, thereby breaking the thin film transistors and/or or insulating films connected thereto. Thus, the destaticizing elements 9 cannot completely protect the transistors or insulating films.

BRIEF SUMMARY OF THE INVENTION

It is the object of the invention to provide a display device capable of quickly shifting to a conductive state in response to even an electrostatic pulse which abruptly rises to a high potential, thereby more completely protecting, from breakage, semiconductor elements and insulating films incorporated in the device.

To attain the object, there is provided a display device comprising:

a substrate;

a plurality of conductive lines formed on the substrate;

semiconductor elements electrically connected to the conductive lines;

display elements electrically coupled to the semiconductor elements;

a short-circuiting line for connecting the conductive lines to each other;

destaticizing elements arranged between the short-circuiting line and the respective conductive lines; and a delaying element connected in series to each of the destaticizing elements.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
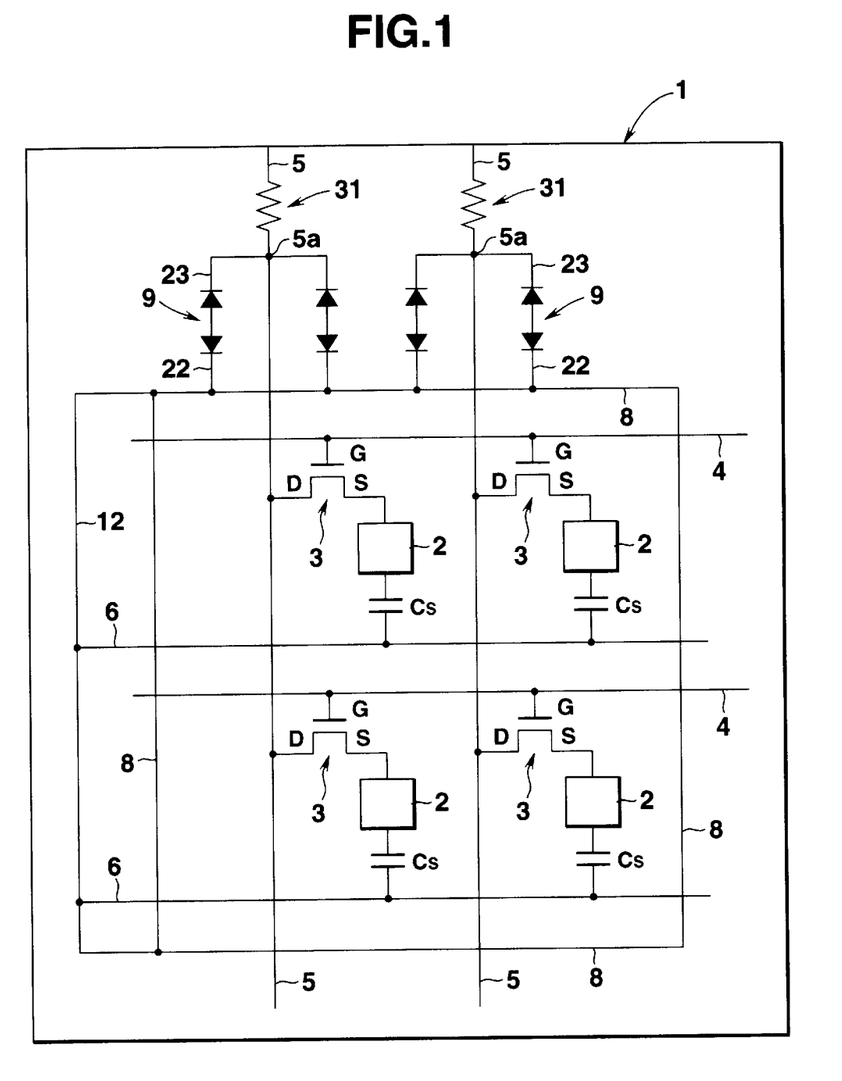
FIG. 1 is a conceptual plan view, showing a circuit formed on an active element substrate which is incorporated in a liquid crystal display device according to a first embodiment of the invention.
Figure 2:
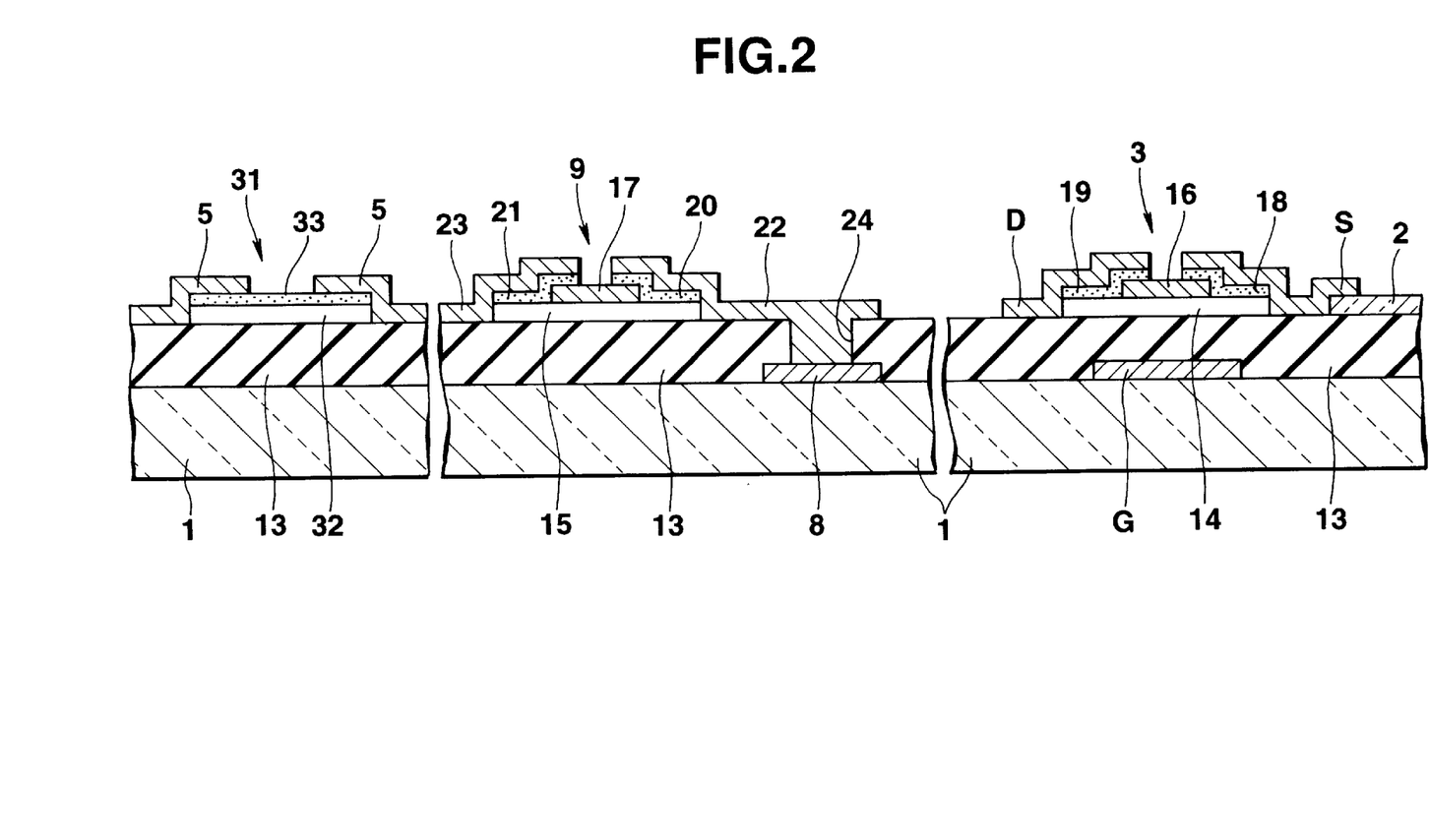
FIG. 2 is an enlarged sectional view, showing part of the active element substrate of FIG. 1.
Figure 9:
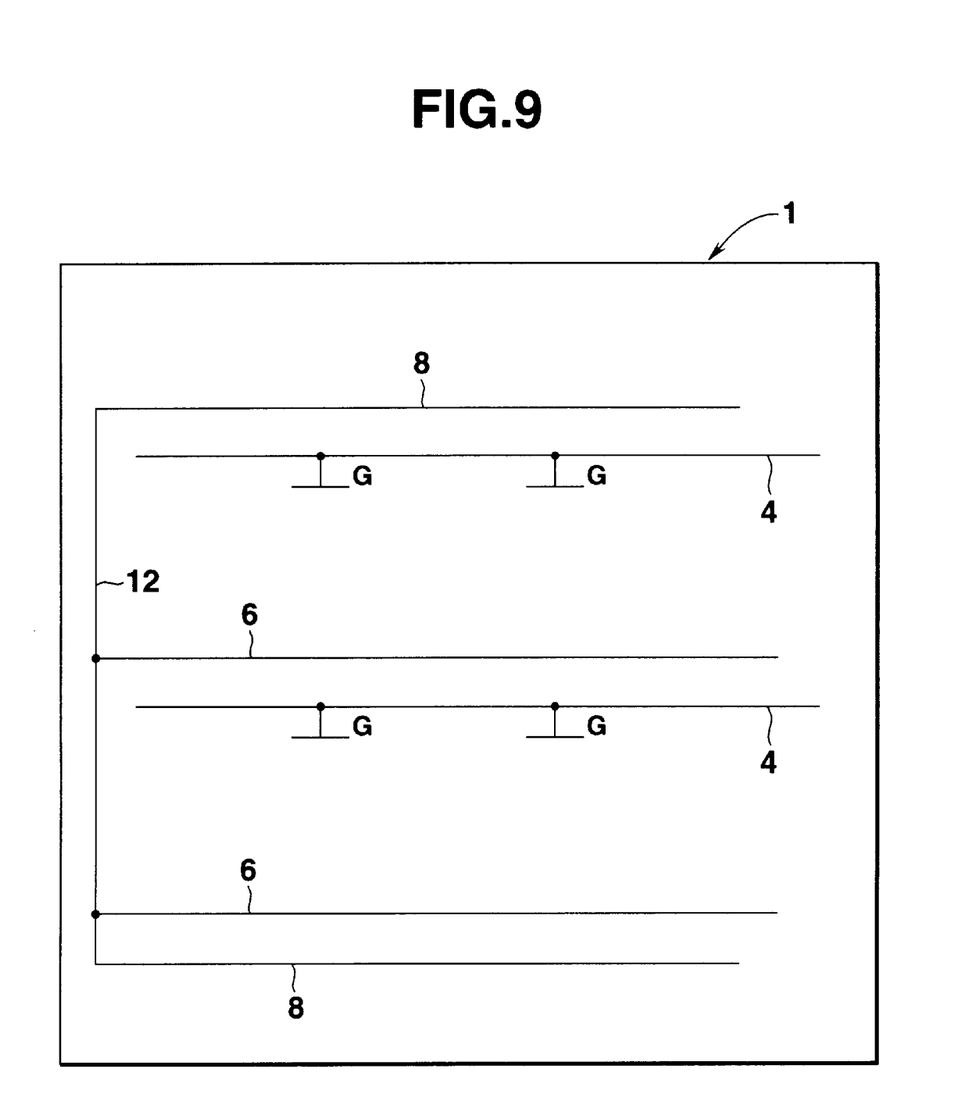
FIG. 9 is an enlarged plan view, showing the state of wiring as a first layer formed on the active element substrate of FIG. 1.

FIG. 1 is a conceptual plan view, showing a circuit formed on an active element substrate which is incorporated in a liquid crystal display device according to a first embodiment of the invention. FIG. 2 is an enlarged sectional view, showing part of the active element substrate of FIG. 1. As is shown in FIGS. 1 and 2, the gate electrodes G of thin film transistors 3 are formed on an active element substrate 1. As is particularly shown in FIG. 9, scanning lines 4, auxiliary capacitance lines 6, a common line 12 and partial upper and lower sides of a short-circuiting line 8 are simultaneously formed on the active element substrate 1, as well as the gate electrodes G.

A gate insulating film 13 is provided on the overall surface of the active element substrate 1 including, for example, the gate electrodes G. A semiconductor thin film 14 formed of intrinsic amorphous silicon is provided on that portion of the gate insulating film 13 which corresponds to each of the gate electrodes G. Similarly, a semiconductor thin film 15 formed of intrinsic amorphous silicon is provided on the gate insulating film 13 in an area in which a destaticizing element 9 is formed. Blocking layers 16 and 17 formed of insulating material are provided on center portions of the semiconductor thin films 14 and 15, respectively. Contact layers 18 and 19 formed of n$^+$-type amorphous silicon with phosphor ions doped therein are provided on opposite side portions of the upper surface of the blocking layer 16 in an area in which a thin film transistor 3 is formed. Similarly, contact layers 20 and 21 formed of n$^+$-type amorphous silicon are provided on opposite side portions of the upper surface of the blocking layer 17 in the area in which the destaticizing element 9 is formed.

A resistive element 31 for delaying an electrostatic pulse comprises a semiconductor thin film 32 of intrinsic amorphous silicon formed on a predetermined portion of the gate insulating film 13, and a semiconductor layer 33 of n$^+$ type amorphous silicon formed on the semiconductor thin film 32. Since the resistive element 31 is interposed in the predetermined portion of each data line 5, opposite side portions of the upper surface of the semiconductor layer 33 are connected to two separated ends of the data line 5.

The aforementioned semiconductor thin films 14, 15 and 32 are simultaneously formed by, for example, plasma CVD. Therefore, they are made of the same material and have the same thickness. Moreover, the contact layers 18–21 and the semiconductor layer 33 are simultaneously formed by depositing the same material using, for example, plasma CVD, then implanting phosphor ions therein and patterning the resultant layers. Thus, those layers are made of the same material, and have the same thickness and ion concentration.

A source electrode S and a drain electrode D are formed on the contact layers 18 and 19 in the area of the thin film transistor 3, respectively. Similarly, connecting electrodes 22 and 23 are formed on the contact layers 20 and 21 in the area of the destaticizing element 9, respectively. One connecting electrode 22 is connected to the short-circuiting line 8 via a contact hole 24 formed in the gate insulating film 13. The other connecting electrode 23 is connected to the portion of each data line 5 which is indicated by reference number 5a in FIG. 1. The data lines 5 and the left and right side portions of the short-circuiting line 8 are formed together with the electrodes S, D, 22 and 23. At this time, the upper and lower ends of the left and right side portions of the short-circuiting line 8 are connected to the right and left ends of each of the upper and lower sides of the short-circuiting line 8 via contact holes (not shown) formed in the gate insulating film 13. Further, before the formation of, for example, the source electrodes S, pixel electrodes 2 consisting of ITO are formed on the those portions of the gate insulating film 13 which are located near the thin film transistors 3, and then the pixel electrodes 2 are connected to the source electrodes S. Thus, the active element substrate 1 has a circuit structure as shown in FIG. 1.

Figure 3A:
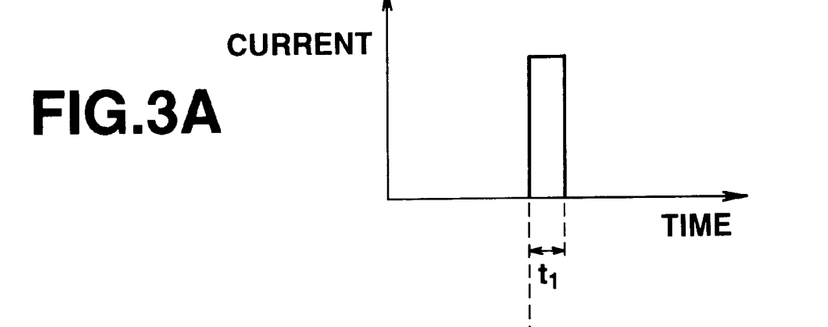
FIGS. 3A and 3B are views, showing pulse waves useful in explaining the function of a resistive element appearing in FIGS. 1 and 2.
Figure 3B:
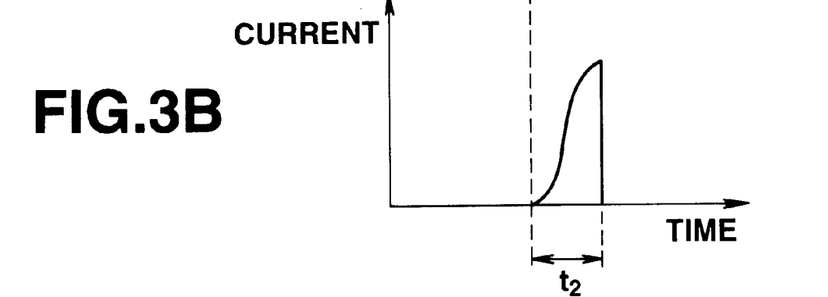

Referring to FIG. 1, a description will be given of an electrostatic pulse which abruptly rises to a high potential is applied to an upper end portion of any one of the data lines 5. As is shown in FIG. 3A, the electrostatic pulse which abruptly rises is considered as a rectangular pulse (with a pulse width of t1). Such a rectangular pulse becomes, after it is applied to the upper end portion of the data line 5, to an inclined pulse gradually rising-up with a wider width t2 than that of the original pulse, as is shown in FIG. 3B. When the pulse potential reaches a predetermined threshold value of the element 9 after a predetermined period of time, the destaticizing element 9 which is connected to the pulse-applied data line 5 becomes conductive. In other words, in this structure, the destaticizing element 9 becomes conductive before the electrostatic pulse rises to an extremely high potential, and hence can work in response to the electrostatic pulse. Accordingly, the potential of static electricity which flows downward through the junction 5a between the data line 5 and the destaticizing element 9 is not so high, which means that an interlayer insulating film or the thin film transistor connected to the data line 5 can be substantially completely protected from breakage due to electrostatic electricity.

Figure 4:
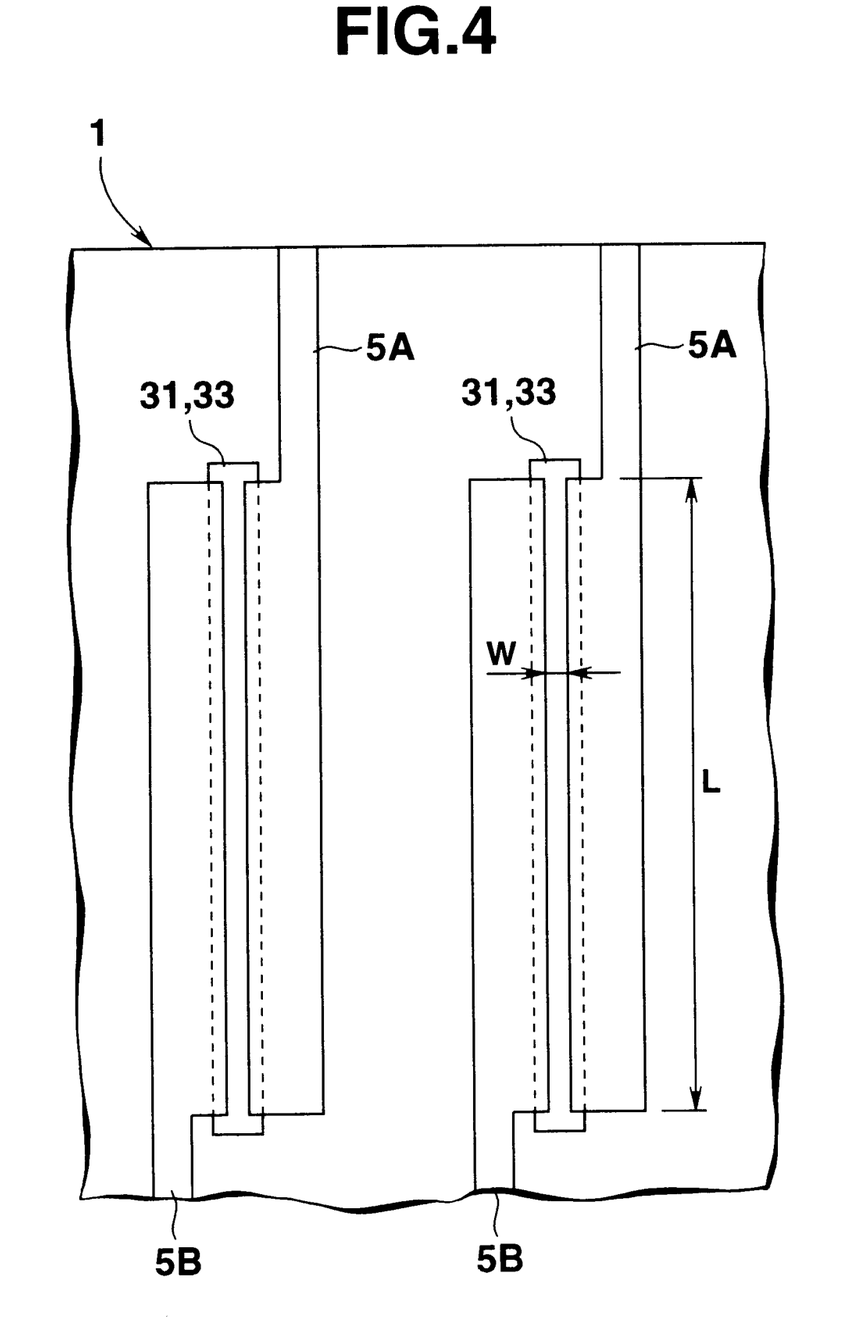
FIG. 4 is an enlarged plan view, showing the resistive element appearing in FIGS. 1 and 2.

Referring then to FIG. 4, an example of, for example, the size of the resistive element 31 will be described. Where the n$^+$-type amorphous silicon semiconductor layer 33 of the resistive element 31 has a thickness of about 250 Å between the upper and lower data lines 5A and 5B, a length L of about 1000 μm, and a width W of 6 μm, the resistance of the resistive element 31 can be set at about 1 MΩ.

Referring then to FIG. 2, a method for forming the resistive element 31 will be described briefly. First, the semiconductor thin film 32 of the resistive element 31 is formed on the gate insulating film 13, together with the semiconductor thin film 14 of the thin film transistor 3 and the semiconductor thin film 15 of the destaticizing element 9. Subsequently, the semiconductor layer 33 is formed on the semiconductor thin film 32, simultaneously with the formation of the contact layers 18 and 19 of the thin film transistor 3 and the contact layers 20 and 21 of the destaticizing element 9. As a result, the resistive element 31 is formed. Since thus, the resistive element 31 is formed simultaneously with the formation of the thin film transistor 3 and the destaticizing element 9, no dedicated process step is necessary to form the element 9 and hence the number of overall manufacturing process steps can be reduced.

Second Embodiment

Figure 5A:
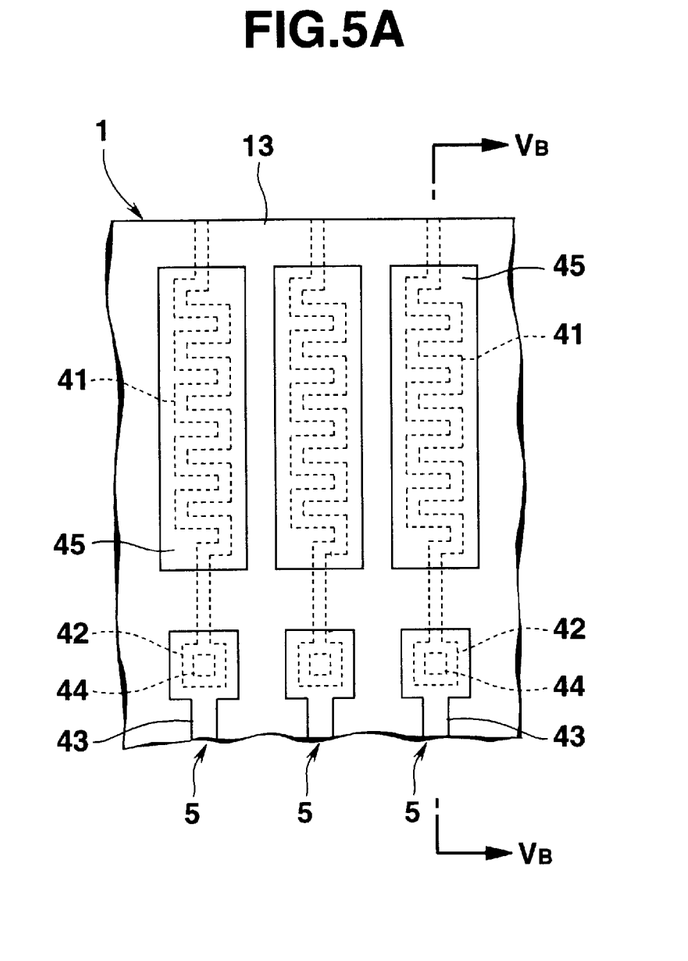
FIG. 5A is an enlarged plan view, showing a second embodiment of the invention.
Figure 5B:
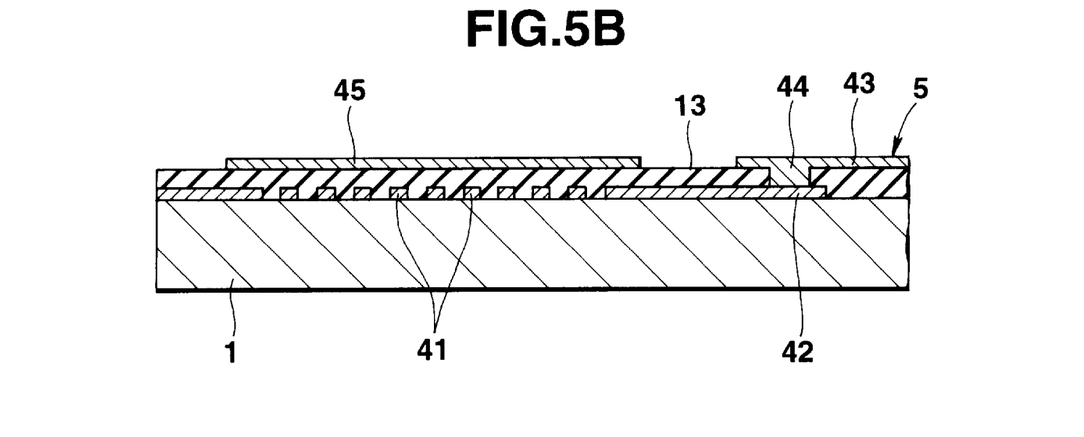
FIG. 5B is an enlarged sectional view, taken along lines $V_B$—$V_B$ of FIG. 5A.

FIG. 5A is a plan view, showing a part of a liquid crystal display device according to a second embodiment of the invention. FIG. 5B is a sectional view, taken along lines $V_B$—$V_B$ of FIG. 5A. A data line 5 incorporated in the second embodiment comprises zigzag portions 41 each of which meanders substantially in the shape of S and is formed on the active element substrate 1 in the vicinity of a predetermined end of the substrate 1, connection pads 42 each formed on the substrate 1 continuous from a predetermined end of the zigzag portion 41, data line main bodies 43 each formed on a predetermined portion of the gate insulating film 13 on the active element substrate 1, and contact holes 44 each formed in the gate insulating film 13 for connecting a predetermined end of a corresponding data line main body 43 to a corresponding connecting pad 42. Dummy data lines 45 for controlling cell gaps are each formed on a corresponding zigzag portion 41 which is provided on the gate insulating film 13. A seal member (not shown) is provided on each of the dummy data lines 45 for adhering the active element substrate 1 to an opposed substrate (not shown). A gap material is diffused in the seal member for determining a gap between the active element substrate 1 and the opposed substrate. If the gap material is not appropriately aligned with the data lines 5 and the scanning lines, the gap will be ununiform. The dummy data lines 45 have substantially the same thickness as the data lines 5 and the scanning lines 4 to keep the gaps constant. The throughput of the dummy data lines 45 can be enhanced when they are made of the same material and have the same thickness.

In this embodiment, the zigzag portions 41 mainly constitute resistive portions for delaying electrostatic pulses. Accordingly, the zigzag portions 41 can delay a short electrostatic pulse as in the first embodiment using the resistive elements 9. In the second embodiment, each zigzag portion 41 can be made as a high-resistance portion by forming a corresponding data line main body 43, contact hole 44 and dummy data line 35 of, for example, aluminum or an aluminum alloy which has a low resistance, and at the same time forming the zigzag portion 41 and a corresponding connection pad 42 of, for example, chromium which has a high resistance.

Figure 6:
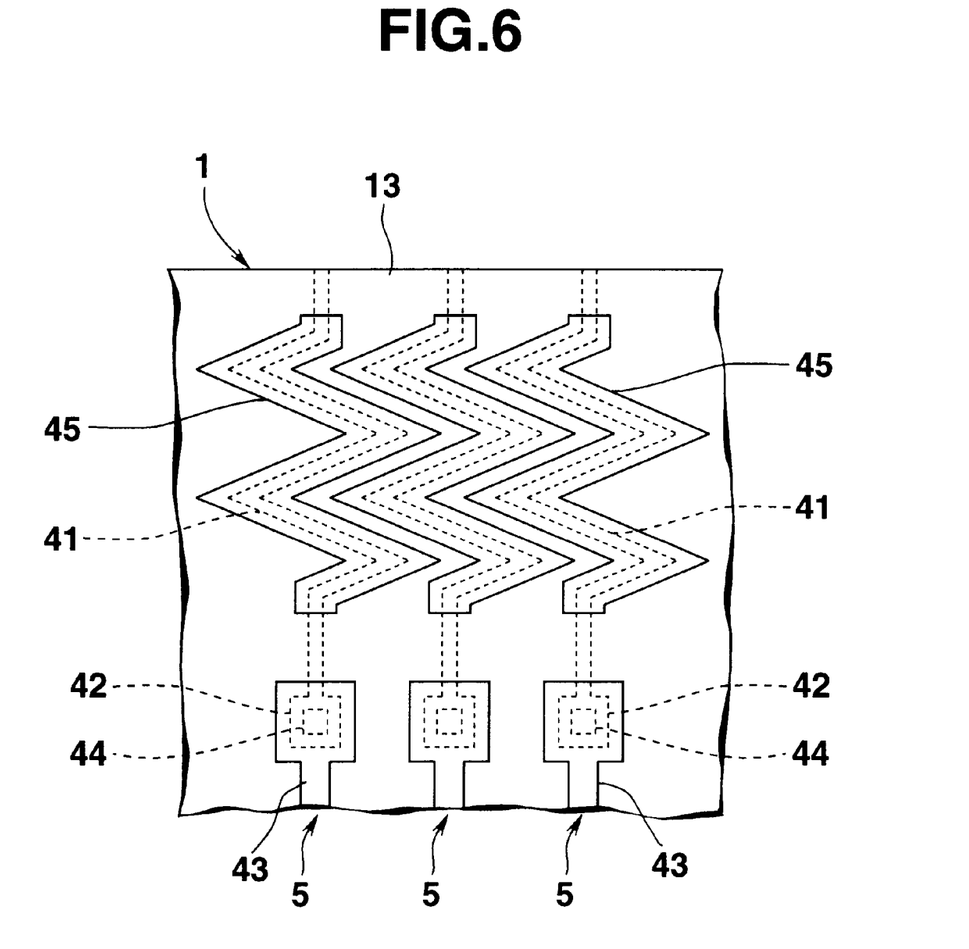
FIG. 6 is an enlarged plan view, showing a third embodiment of the invention.

FIG. 6 shows a third embodiment, wherein the zigzag portions 41, which have square shaped corners and are used as electrostatic pulse delaying elements in the FIG. 5A case, are substantially V-shaped. The zigzag portions can have various patterns other than the aforementioned ones when they are formed of metallic thin films.

Fourth Embodiment

Figure 7:
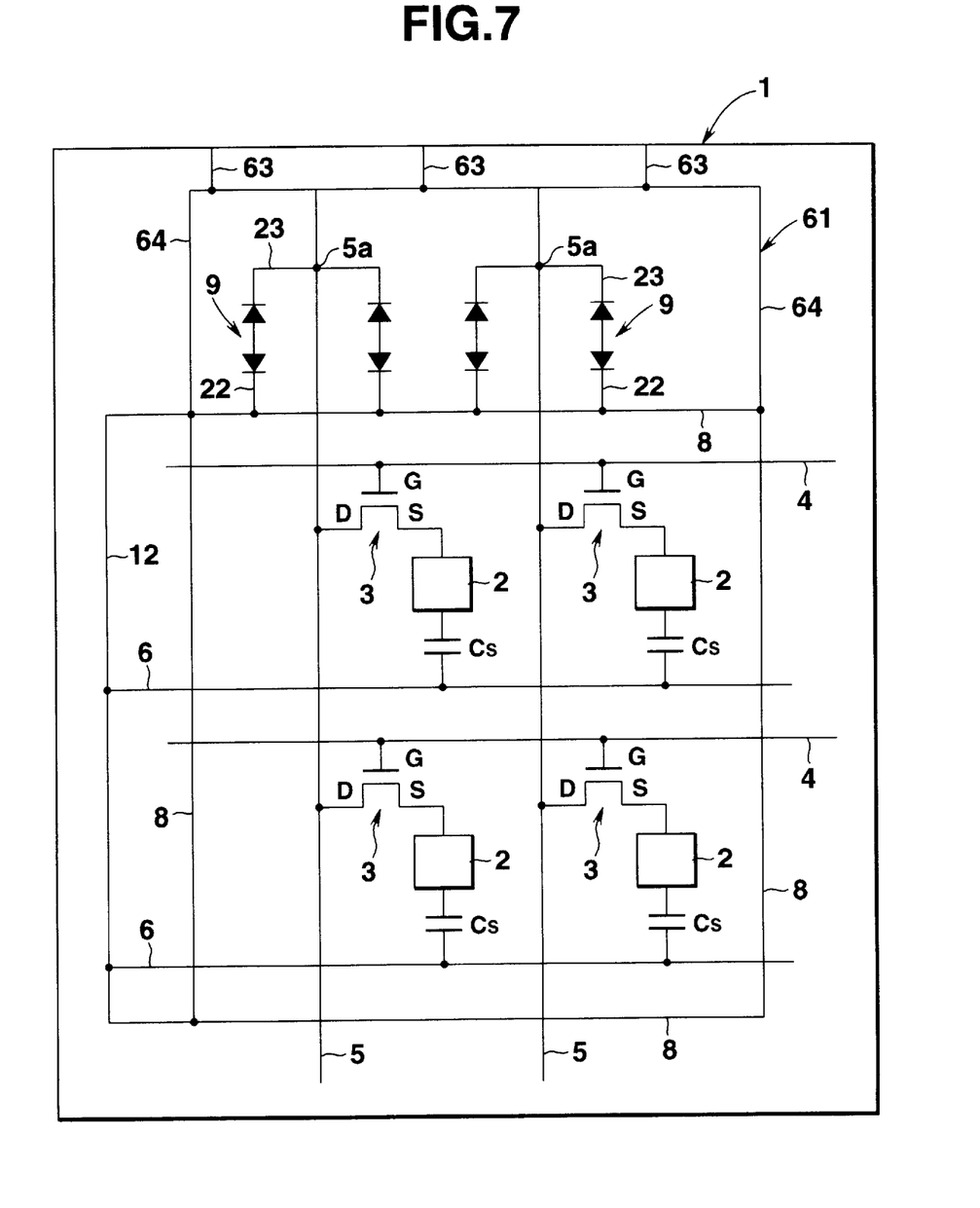
FIG. 7 is a conceptual plan view, showing a circuit formed on an active element substrate which is incorporated in a liquid crystal display device according to a fourth embodiment of the invention.
Figure 8:
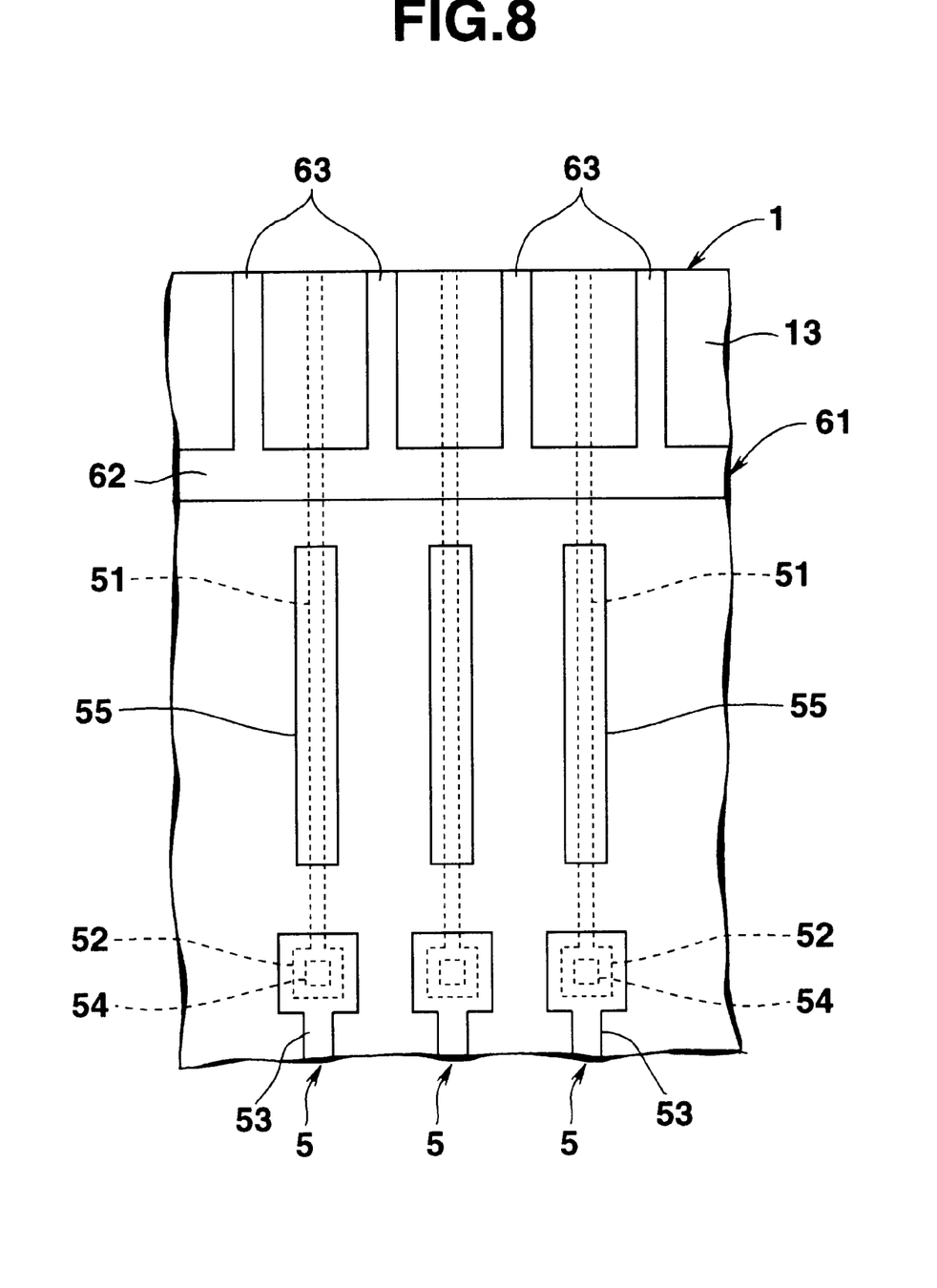
FIG. 8 is an enlarged plan view, showing part of the active element substrate of FIG. 7.

FIGS. 7 and 8 show a fourth embodiment of the invention. In these figures, elements substantially similar to those of FIG. 1 are denoted by the same reference numerals, and their explanation is omitted. Each data line 5 incorporated in the fourth embodiment comprises a linear portion 51 formed on the active element substrate 1 in the vicinity of an upper end portion thereof, a connection pad 52 extending on the substrate 1 from a predetermined end of the linear portion 51, a data line main body 53 formed on a predetermined portion of the gate insulating film 13 on the substrate 1, and a contact hole 54 formed in the gate insulating film 13 for connected a predetermined end of the data line main body 53 to the connection pad 52. Also in this case, a dummy data line 55 for cell gap control is formed on the linear portion 51 which is provided on the gate insulating film 13.

A lightening rod wire 61 is formed on the gate insulating film 13 between the upper end of the active element substrate 1 and the dummy data lines 55. The lightening rod wire 61 comprises a wire 62 extending in a direction perpendicular to the linear portions 51 of the data lines 5, wires 63 extending from the wire 62 to the upper end of the substrate 1 between each pair of adjacent linear portions 51 and outside the linear portions 51, and wires 64 extending from the opposite ends of the wire 62 to the upper right and left ends of the short-circuiting 8. The data line main bodies 53, contact holes 54, dummy data lines 55 and the lightening rod wire 61 are formed of, for example, aluminum or an aluminum alloy which has a low resistance, and the linear portions 51 and the connection pads 52 are formed of, for example, chromium which has a high resistance.

When in this liquid crystal display device, static electricity is applied to a predetermined upper end portion of the active element substrate 1, it is not discharged to the linear portion 51 of a high resistance located in the vicinity of the predetermined upper end portion, but to the end of the wire 63 of the lightening rod wire 61 of the low resistance in the vicinity of the same. The discharged static electricity flows to the common line 12 and the auxiliary capacitance lines 6 via the wires 63, 62 and 64 of the lightening rod wire 61, and further to all data lines 5 since the destaticizing elements 9 become conductive. As a result, thin film transistors 3 and insulating films connected to all data lines 5 are protected from breakage due to static electricity. The same effect can be seen where the static electricity is in a pulse state in which its potential abruptly increases. The resistive element 31 shown in FIGS. 2 or 4 may be provided at the linear portion 51 of each data line 5 for increasing the degree of security. Moreover, the linear portion 51 may be formed as a low-resistance portion consisting of the zigzag portion 41 shown in FIGS. 5 or 6. In addition, a high-resistance protecting element of the same structure as the destaticizing element 9 may be provided at the wire 64 of the lighting rod wire 61.

Although in the first or second embodiment, one resistive element 31 or one resistive portion consisting of one zigzag portion 41 is provided at each data line 5, a plurality of resistive elements or resistive portions connected in series or in parallel may be provided at each data line 5. Moreover, although in each of the embodiments, the destaticizing element 9 is provided at each data line 5, it may be provided at each scanning line 4, too, or at each scanning line 4 only. In this case, it suffices if the resistive element 31 or the resistive portion consisting of the zigzag portion 41 is provided at the scanning line 4, or if the lightening rod wire 61 is provided in the vicinity of a predetermined end of the scanning line 4. When in this structure, static electricity is applied to the scanning line 4, each element operates in the same manner as in the case where it is applied to the data line 5. Furthermore, even when static electricity is applied directly to the short-circuiting line 8, it flows to all data lines 5 and hence breakage due to the static electricity can be prevented.

As described above, when in the invention, a short electrostatic pulse which abruptly rises to a high potential is applied to a data line, a scanning line or a short-circuiting line, it is converted to a pulse which gently rises using a delaying element and made to flow through a destaticizing element before its potential becomes high. Therefore, semiconductor elements such as thin film transistors or insulating films, which are connected to the line to which the electrostatic pulse is applied, can be reliably protected from breakage due to the pulse.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A display device comprising:
   a substrate;
   a plurality of conductive lines formed on the substrate;
   semiconductor elements electrically connected to the conductive lines;
   display elements electrically coupled to the semiconductor elements;
   a short-circuiting line connecting the conductive lines to each other;
   a destaticizing element arranged between the shortcircuiting line and each of the conductive lines; and
   an electrostatic pulse delaying element connected in series to each said destaticizing element.

2. A display device according to claim 1, wherein the electrostatic pulse delaying element is a high-resistance element.

3. A display device according to claim 2, wherein the electrostatic pulse delaying element comprises a semiconductor film.

4. A display device according to claim 2, wherein the electrostatic pulse delaying element comprises a metallic film.

5. A display device according to claim 2, comprising a metallic film with a same thickness as the conductive lines formed on the electrostatic pulse delaying element.

6. A display device according to claim 1, further comprising a metallic film serving as a lightening rod formed around the electrostatic pulse delaying element.

7. A display device according to claim 1, wherein the destaticizing element comprises a semiconductor film.

8. A display device according to claim 7, wherein the electrostatic pulse delaying element comprises a diode.

9. A display device according to claim 7, wherein the electrostatic pulse delaying element comprises a semiconductor element.

10. A display device according to claim 7, wherein the destaticizing element comprises an amorphous silicon semiconductor layer.

11. A display device according to claim 10, wherein the electrostatic pulse delaying element comprises an amorphous silicon semiconductor layer.

12. A display device according to claim 1, wherein the electrostatic pulse delaying element comprises an intrinsic semiconductor layer and an impurity-doped semiconductor layer formed on the intrinsic semiconductor layer.

13. A display device according to claim 1, wherein the destaticizing element comprises an intrinsic semiconductor layer and an impurity-doped semiconductor layer formed on the intrinsic semiconductor layer.

14. A display device according to claim 13, wherein the electrostatic pulse delaying element comprises an intrinsic semiconductor layer and an impurity-doped semiconductor layer formed on the intrinsic semiconductor layer.

15. A display device comprising:
   a substrate;
   a plurality of conductive lines formed on the substrate;
   display elements electrically coupled to the conductive lines;
   a short-circuiting line connecting the conductive lines to each other;
   a destaticizing element arranged between the shortcircuiting line and each of the conductive lines; and
   an electrostatic pulse delaying element connected in series to each said destaticizing element;
   wherein each said destaticizing element and each said electrostatic pulse delaying element comprises an intrinsic semiconductor layer and an impurity-diffused semiconductor layer formed on the intrinsic semiconductor layer.

16. A display device according to claim 15, wherein the intrinsic semiconductor layer and the impurity-diffused semiconductor layer of each said destaticizing element and each said electrostatic pulse delaying element are formed of substantially a same material and have substantially a same thickness.

17. A display device comprising:
   a substrate;
   a plurality of conductive lines formed on the substrate;
   a plurality of semiconductor elements electrically coupled to the conductive lines;
   a plurality of display elements electrically coupled to the semiconductor elements;
   a short-circuiting line connecting the conductive lines to each other;
   a destaticizing element arranged between the short-circuiting line and each of the conductive lines; and
   a metallic film serving as a lightening rod formed between an end of the substrate and the short-circuiting line.

* * * * *